(12) United States Patent
Arad

(10) Patent No.: US 8,074,008 B2
(45) Date of Patent: *Dec. 6, 2011

(54) MOTHERBOARD WITH VIDEO DATA PROCESSING CARD CAPABILITY

(75) Inventor: Eli Arad, Givot Smoot (IL)

(73) Assignee: Broadcom Corporation, Irvine, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/557,056

(22) Filed: Sep. 10, 2009

(65) Prior Publication Data

US 2010/0005210 A1    Jan. 7, 2010

Related U.S. Application Data

(63) Continuation of application No. 11/153,396, filed on Jun. 16, 2005, now Pat. No. 7,603,506.

(60) Provisional application No. 60/580,388, filed on Jun. 18, 2004.

(51) Int. Cl.
*G06F 13/14* (2006.01)

(52) U.S. Cl. ........................................... 710/305

(58) Field of Classification Search .................. 710/300, 710/305

See application file for complete search history.

(56) References Cited

U.S. PATENT DOCUMENTS

| | | | |
|---|---|---|---|
| 4,370,709 A * | 1/1983 | Fosdick | ............ 703/26 |
| 5,497,498 A | 3/1996 | Taylor | |
| 5,537,601 A | 7/1996 | Kimura et al. | |
| 5,909,559 A | 6/1999 | So | |
| 5,999,733 A | 12/1999 | Shamoto | |
| 6,188,381 B1 | 2/2001 | van der Wal et al. | |
| 6,209,077 B1 | 3/2001 | Robertson et al. | |
| 6,313,845 B1 | 11/2001 | Terry et al. | |
| 6,477,641 B2 | 11/2002 | Davis et al. | |
| 6,578,197 B1 | 6/2003 | Peercy et al. | |
| 6,629,312 B1 | 9/2003 | Gupta | |
| 6,717,581 B2 | 4/2004 | Langendorf | |
| 6,772,265 B2 * | 8/2004 | Baweja et al. | ............ 710/303 |
| 6,809,732 B2 | 10/2004 | Zatz et al. | |
| 6,873,331 B2 | 3/2005 | Emmot et al. | |
| 6,891,592 B2 | 5/2005 | Magana et al. | |
| 6,940,515 B1 * | 9/2005 | Moreton et al. | ............ 345/522 |
| 7,176,914 B2 | 2/2007 | Emmot | |
| 7,333,108 B2 | 2/2008 | Takahashi | |
| 7,359,334 B2 | 4/2008 | Matsunaga et al. | |
| 2002/0081090 A1 | 6/2002 | Agnihotri et al. | |

(Continued)

FOREIGN PATENT DOCUMENTS

EP        1063801 A2    12/2000

OTHER PUBLICATIONS

Clarke, Peter, "Startup Tips Application-Specific Video Processor", May 2001, EETimes.

*Primary Examiner* — Mohammed Rehman
(74) *Attorney, Agent, or Firm* — Sterne, Kessler, Goldstein & Fox P.L.L.C.

(57) ABSTRACT

The motherboard comprises a CPU and a memory component; further at least one video data processing chip mounted to the motherboard wherein the video data processing chip is programmable; and further at least one additional memory component provided to store a software that is executable by the video data processing chip.

24 Claims, 2 Drawing Sheets

U.S. PATENT DOCUMENTS

| | | |
|---|---|---|
| 2002/0099980 A1 | 7/2002 | Olarig |
| 2003/0037335 A1 | 2/2003 | Gatto et al. |
| 2003/0038842 A1 | 2/2003 | Peck et al. |
| 2003/0156188 A1 | 8/2003 | Abrams |
| 2004/0012597 A1 | 1/2004 | Zatz et al. |
| 2004/0205217 A1 | 10/2004 | Gabrani et al. |
| 2004/0257369 A1* | 12/2004 | Fang .......................... 345/501 |
| 2005/0140688 A1 | 6/2005 | Pallister |
| 2005/0283559 A1 | 12/2005 | Arad |
| 2005/0289507 A1 | 12/2005 | Spektor et al. |
| 2005/0289523 A1 | 12/2005 | Spektor et al. |
| 2006/0174230 A1 | 8/2006 | Drayton et al. |

\* cited by examiner

MOTHERBOARD WITH VIDEO DATA PROCESSING CARD CAPABILITY

CROSS REFERENCE TO RELATED APPLICATIONS

This application is a continuation U.S. application Ser. No. 11/153,396, entitled "Motherboard with Video Data Processing Capacity," filed Jun. 16, 2005, which claims benefit to U.S. Provisional Application No. 60/580,388, filed on Jun. 18, 2004, and titled "Computer Motherboard with Video Data Processing Card Capability," each of which is incorporated by reference herein in its entirety.

BACKGROUND OF THE INVENTION

1. Field of the Invention

The present invention relates generally to motherboards of electronic data processing devices like computers, e.g. PCs, and video data processing devices like personal video recorders, and further to personal video recorders and computers, e.g. PCs, equipped with such a motherboard.

2. Background Art

Referring now to FIG. 1, there is shown a motherboard 1 of a PC (personal computer) according to the prior art.

Typically, the motherboard 1 comprises a CPU 2, a mathematical co-processing component (CoPro 3), a Direct Memory Access component (DMA 4), a quartz or crystal oscillator 5, cache memory components 6, a RAM-BIOS component 7, several plug-in places or card slots 8, and memory banks 9, etc.

As can be seen from FIG. 1, the several components of the motherboard 1 are linked by one or several bus systems comprising e.g. respective data, address, and/or control buses, e.g., a PCI bus system 10.

Further, into the above memory bank 9, one or several SIMM modules can be plugged, each carrying several RAM components, e.g., respective DRAM (or VRAM) memory chips.

Further, into the plug-in places—optionally—one or several peripheral component cards can be plugged in, e.g., respective sound cards, video data processing cards, graphic data processing cards, modem cards, etc.

For example, a modem card (which might e.g. comprise one or several modem chips, and one or several memory chips, etc.) might e.g. control the data interchanged between the PC, and an external computer and/or telephone network, e.g. an Intranet, and/or the Internet (e.g. by use of a respective ISDN or DSL line), etc.

In addition, a graphic data processing card (which might e.g. comprise one or several non-programmable data processing chips, and one or several memory chips, etc.), for instance, might e.g. control the data interchanged between the PC, and a monitor connected thereto.

The prior art systems as described above have several disadvantages.

For instance, the relatively big distance between the card, and the components (e.g., the CPU 2) on the motherboard makes it difficult to use high data rates in the communication between the card, and the components (e.g., the CPU 2) on the motherboard. This is specially disadvantageous for real time processing.

Further, the plug-in connection between the card, and the motherboard might—e.g. due to signal reflections caused by the connection—lead to a relatively high distortion of the signals exchanged between the card, and the components on the motherboard.

Still further, the cards show little flexibility as to their functionality. If a different functionality is needed in general a different card has to be used.

Therefore, what is needed is new system and a new method, in particular, a new motherboard, with which the above and/or other drawbacks of the prior art might be overcome.

Further limitations and disadvantages of conventional and traditional approaches will become apparent to one of skill in the art, through comparison of such systems and methods with the present invention as set forth in the remainder of the present application with reference to the drawings.

BRIEF SUMMARY OF THE INVENTION

According to the present invention, these objects are achieved by a motherboard as defined in the claims, substantially as shown in and/or described in connection with at least one of the figures, as set forth more completely in the claims.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
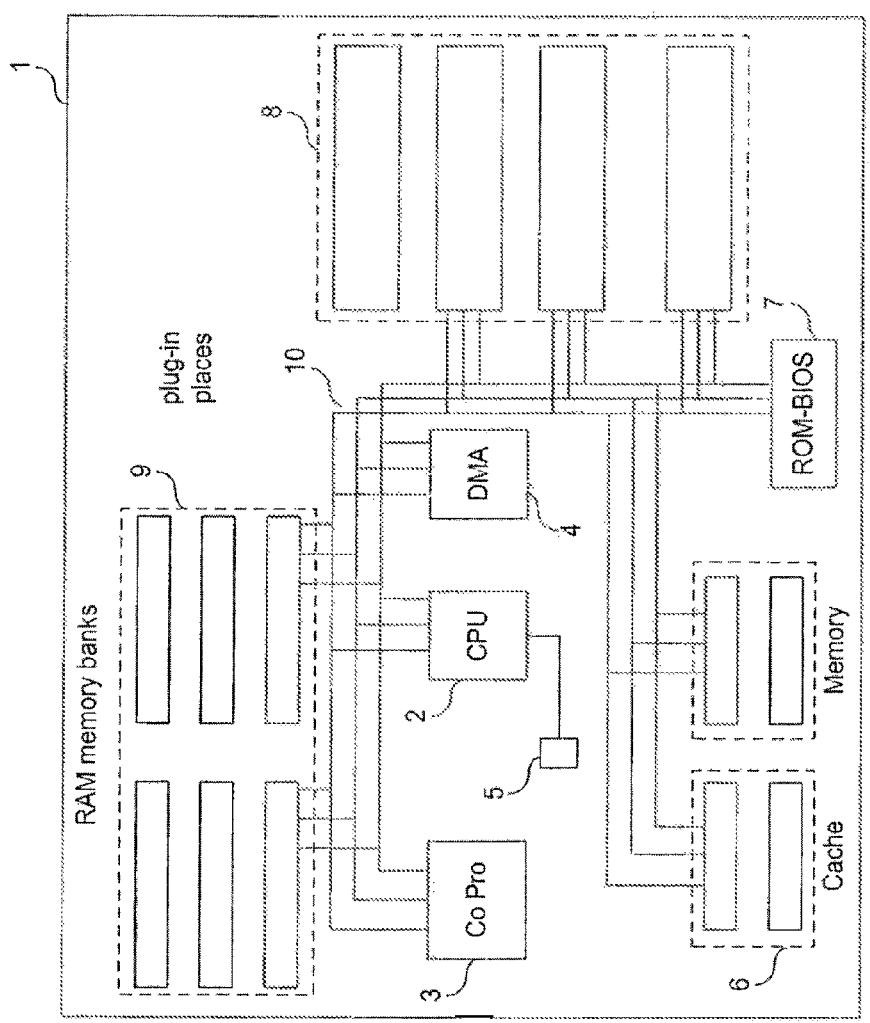
FIG. 1 illustrates a motherboard of a prior art PC.

According to an aspect of the invention, a motherboard comprises a CPU and a memory component; further at least one video data processing chip mounted to the motherboard wherein the video data processing chip is programmable; and further at least one additional memory component provided to store a software that is executable by the video data processing chip.

This motherboard has the advantage that its video and/or graphics data processing chip is flexibly usable. For example, the performance of the video and/or graphics data processing chip can be enhanced by an improved software, or different functional features can be added. Also, the performance can be adapted to different environments like server applications, desktop applications, portable (notebook, PDA etc.) applications, and so forth with their respective needs.

In a preferred embodiment, the video data processing chip is capable to execute different functions dependent on the software stored in the additional memory component(s). Different functions may be, e.g., storing video streams, video encoding and/or decoding, picture/image editing, and so on. This greatly enhances the flexibility of the motherboard.

In another preferred embodiment the video and/or graphics data processing chip is an additional CPU, particularly if this chip is compatible with Intel and/or AMD chip (set) instructions. This is particularly advantageous if the different functions are not restricted to video/graphics applications even if the additional CPU may be specially useful/adapted for video/graphics applications, e.g. because of potential specifications (e.g. clock rate, special graphics instructions etc.), or because of the environment or arrangement on the motherboard (e.g. only access to the additional memory component (s), access to graphics bus, graphics interfaces etc.). Particularly in a dual-processor/multiple-processor system, one of the CPUs may then be used, and the relating system may be designed accordingly, to perform encoding tasks, if necessary; when there are no significant graphical tasks to perform, this CPU may then be used for other purposes, e.g. arithmetics etc.

In one embodiment, the pins of the video data processing chip and/or one or all additional memory components are directly soldered to the motherboard. Advantageously, the pins are soldered to the surface of the motherboard.

In general, it is particularly preferred if the video data processing chip is a special video encoder and/or video decoder which might lead to a simpler chip design, faster processing etc. This encoder chip may mainly perform video compression and/or decompression tasks, particularly for real time processing. In one embodiment, the encoder chip is specialized to perform MPEG encoding/decoding, e.g. MPEG-1, MPEG-2 etc.). The use of a specialized encoder chip directly placed onto a motherboard is an invention of its own, wherein the fact that this specialized encoder chip is programmable is clearly advantageously.

In a further embodiment, the CPU and the video data processing chip are linked by a bus system, e.g. of the Northbridge, AGP, PCI, PCI-X, PCI-Express bus, and so on type of bus system. Then, a PCI bus system is particularly preferred.

In another variant, the video data processing chip and/or at least one or all of the additional memory components are directly plugged into the motherboard. Advantageously, the pins of the video data processing chip and the at least one additional memory component are directly plugged into the motherboard.

Another aspect of the invention comprises the configuration (e.g. setting-up or initializing) of the motherboard described above. The respective method comprises the step of configuring a software within the additional memory component(s), wherein—when the software is executed by the video data processing chip—a different software can cause the video data processing chip to fulfill a different function. Thus, by exchanging the software, e.g. a first software program by a second, different software program, the functionality and/or performance of the video data processing chip can be changed accordingly, e.g. from a first functionality/performance to a second, different functionality/performance. For example, a user could upload a software program into the at least one additional memory component to change the desired functionality, e.g. from receiving videos over a video stream to editing this video or single pictures/frames out of this video.

Advantageously, more than one software program may be stored within the at least one additional memory component so that a change/switch in functions can be achieved fastly, i.e. without repeated uploading/installing. Then it is preferred, if different software programs may be stored in different additional memory components, e.g. portable memory units like (mini) SD Cards, Memory Sticks, USB sticks, MMCs, and so on.

These and other advantages, aspects and novel features of the present invention, as well as details of an illustrated embodiment thereof, will be more fully understood from the following description and drawings.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known features, processes and steps have not been described in detail in order not to unnecessarily obscure the present invention.

Figure 2:
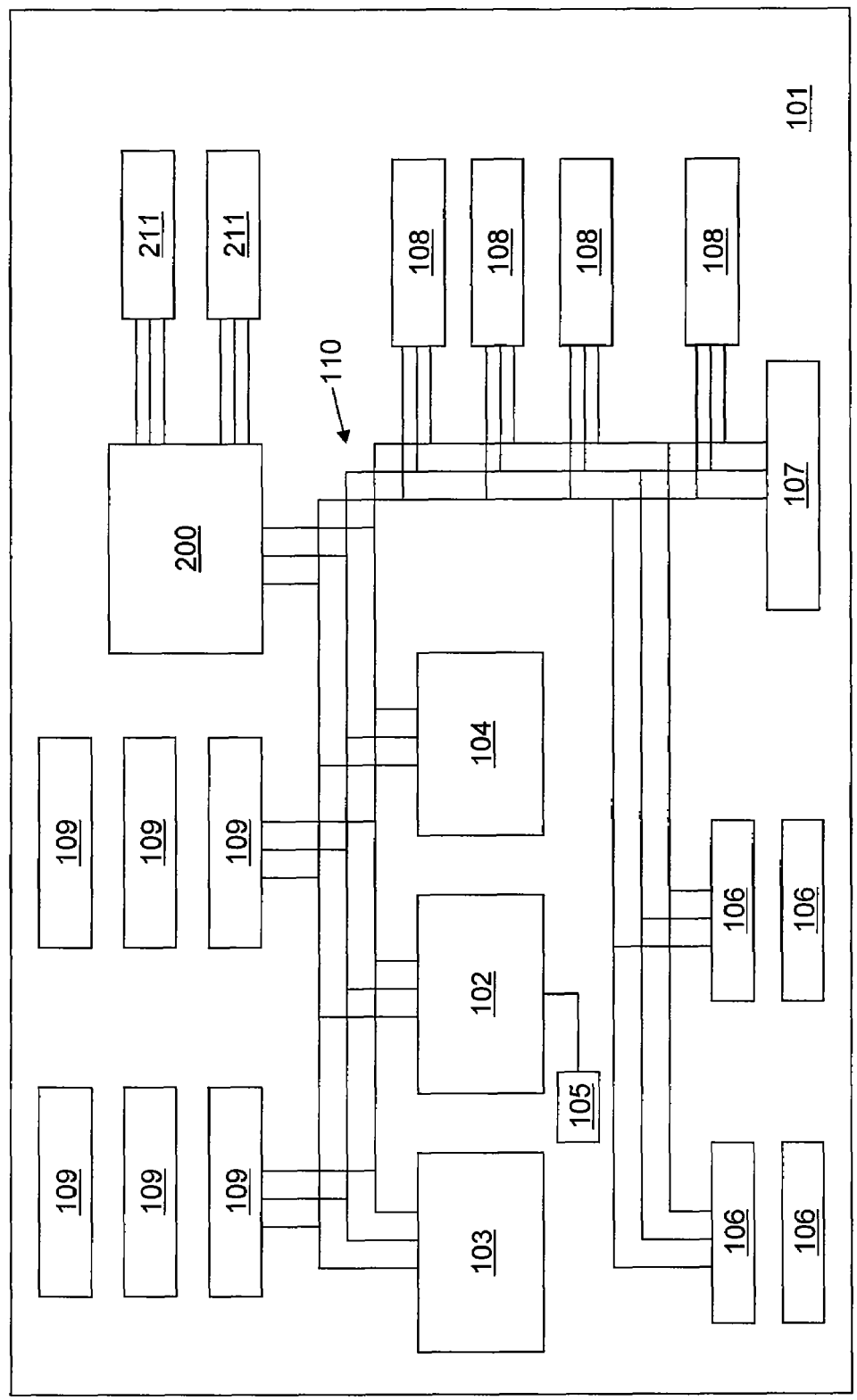
FIG. 2 illustrates a motherboard of a PC in accordance with an embodiment of the present invention.

Referring now to FIG. 2, there is shown a motherboard 101 in accordance with an embodiment of the invention, e.g. a motherboard 101 built into a PC (personal computer), or a Personal Video Recorder (PVR), or set-top box.

The motherboard 101 comprises a CPU 102, a co-processing component 103, a Direct Memory Access component 104, a quartz or crystal oscillator 105, cache memory components 106, a RAM-BIOS component 107, several plug-in places or card slots 108, and memory banks 109, etc.

As can be seen from FIG. 2, the several components of the motherboard 101 are linked by one or several bus systems 110 comprising e.g. respective data, address, and/or control buses, e.g., a PCI bus system.

Further, into the above memory bank 109, one or several SIMM modules can be plugged, each carrying several RAM components, e.g., respective DRAM (or VRAM) memory chips.

Further, into the plug-in places 108—optionally—one or several peripheral component cards can be plugged in, e.g., respective sound cards, modem cards, etc.

For example, a modem card (which might e.g. comprise one or several modem chips, and one or several memory chips, etc.) might e.g. control the data interchanged between the PC, and an external computer and/or telephone network, e.g. an Intranet, and/or the Internet (e.g. by use of a respective ISDN or DSL line), etc.

Further, according to the present embodiment of the invention, the motherboard 101 comprises one or several graphic and/or video data processing chips 200 that are directly mounted to the motherboard 101. Hence, the use of a conventional, separate graphic and/or video data processing card (which might e.g. comprise one or several non-programmable data processing chips, and one or several memory chips, etc.) that might be plugged into one of the plug-in places 108 is only optional. This might be the case when the video data processing chip(s) 200 has an encoding and/or decoding function, e.g. is an encoder. Alternatively, the on-board use of the video data processing chip(s) 200 (particularly encoder and/or decoder) allows the use of simplified graphics cards leading to, e.g., less power consumption of these cards.

For instance, the graphic and/or video processing chip or chips 200 might be directly soldered to the motherboard 101, e.g., directly soldered to the surface of the motherboard 101.

In an embodiment, the pins of the graphic and/or video processing chip or chips 200 might e.g. be inserted into respective holes on the surface of the motherboard (or going through the motherboard)—or into respective holes of a housing coupled on the surface of the motherboard. Thereafter, the pins might be soldered to the motherboard 101 (or to the above housing coupled thereto).

The graphic and/or video data processing chip(s) 200 might be connected by other means, e.g. by flip-chip packaging etc.

As can be seen in FIG. 2, the components of the motherboard 101 (e.g., the CPU 102 and/or the co-processing component 103 and/or the Direct Memory Access component 104 and/or the cache memory components 106 and/or the memory banks 109, etc.) are directly linked to the graphic and/or video data processing chip or chips 200 by a bus system 110, e.g., the above PCI bus system. Hence, the pins of the graphic and/or video data processing chip or chips 200 are directly linked with respective pins of e.g. the CPU 102 and/or the co-processing component 103 and/or the Direct Memory Access component 104 and/or the cache memory components 106, etc. through respective bus lines of the bus system present on or in the motherboard 101 (and not—additionally—via respective bus lines on a graphic and/or video data processing card).

In the present embodiment of the invention, programmable graphic and/or video data processing chip or chips 200 are used. In other words, the chip(s) 200 are mounted directly to the motherboard and may fulfill the same or a corresponding function or sub-function (like encoding or decoding) as corresponding chips on a conventional graphic and/or video data processing card, but this function might not or partly not be fulfilled in hardware, but—at least partly—in software.

As a video data processing chip or chips 200, an (additional) CPU 200 might be used, particularly if its instruction set is at least partially compatible with Intel and/or AMD and/or Transmeta etc. instruction sets.

Further present are one or several additional memory components 211 (all of them—similarly as the chip or chips 200 described above—mounted directly to the surface of the motherboard 101). The type of additional memory components 211 is not restricted and can comprise RAM (DRAM SRAM etc.) and/or ROM (EEPROM, flash etc).

Such additional (graphic and/or video processing) memory chip or chips 211 might be directly soldered to the motherboard 101, e.g., might be directly soldered to the surface of the motherboard 101. In an embodiment, the pins of the additional (graphic and/or video processing) memory chip(s)/unit(s) 211 might e.g. be inserted into respective holes on the surface of the motherboard 101, or into respective holes of a housing coupled on the surface of the motherboard 101. Thereafter,—just as the above graphic and/or video data processing chips 200—the above memory chip(s)—adapted to cooperate with the graphic and/or video data processing chips—might be soldered to the motherboard 101 (or to the above housing coupled thereto).

In another embodiment, the additional memory component(s) 211 may be removable, e.g. Memory Cards etc. can be used that are plugged-in into respective plug-in places.

In this embodiment, the additional memory component(s) 211 that are assigned to the video data processing chip 200, are directly linked to the video data processing chip/unit 200. In an alternative embodiment, the additional memory component(s) 211 are linked to the video data processing chip/unit 200 via the bus system 110.

In the additional memory component or components 211, a software is stored that—when executed by the additional video data processing unit 200—causes the additional CPU 200 to fulfill a function corresponding to that of a conventional graphic and/or video data processing card. Also, several different software programs/packages can be stored in the additional memory component(s) 211.

If a different or amended function is desired, instead of having to use a completely different card, simply a new or amended software is stored/installed on the above additional memory component(s) 211. This preferably might be done by the PC user in a corresponding way as common standard software (e.g., word processing software, etc.) is installed on the PC. If several software programs are stored, the respective different functionalities might be activated by, e.g., soft switching. The functionality of the video data processing chip or chips 200 is not restricted to a special graphics function.

Hence, a much bigger flexibility is achieved, as by the use of conventional graphic and/or video data processing cards.

In one functionality, the graphic and/or video data processing chip or chips 200 might be built and/or function exactly the same way as or similar to conventional graphic and/or video data processing chip or chips 200 usually mounted to a respective conventional graphic and/or video data processing card. Hence, the graphic and/or video data processing chip or chips 200—just as is usually done by a respective graphic data processing card—for instance might e.g. control the data interchanged between the PC, and a monitor, television set, or any other kind of display connected thereto.

Due to the relatively small distance between the components (e.g., the CPU 102) on the motherboard 101, and the graphic and/or video data processing chip or chips 200 and/or the above memory chip(s) 211, a relatively high data rate might be used in the communication between the graphic and/or video data processing chip or chips 200 (and/or the above memory chip), and the components (e.g., the CPU 102) on the motherboard 101.

Further, as additional card-plug-in-connections are avoided, signal distortions due to e.g. respective signal reflections on the card-plug-in-connections are reduced.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims, including the combination of dependent claims.

What is claimed is:

1. An apparatus for processing video data, comprising:
a video data processing chip configured to process said video data using a first function and a second function, said first function being different from said second function; and
at least one memory component, coupled to said video data processing chip, provided to store a first software program configured to fulfill said first function when it is executed by said video data processing chip and a second software program configured to fulfill said second function when it is executed by said video data processing chip, said video data processing chip being configurable to load said first software program to perform said first function and to change functionality of said video data processing chip from said first function to said second function by loading said second software program during processing of said video data.

2. The apparatus of claim 1, wherein said at least one memory component comprises:
a first memory component provided to store said first software program; and
a second memory component provided to store said second software program.

3. The apparatus of claim 1, wherein at least one of a group consisting of said first function and said second function comprises at least one of:
a video compression function; and
a video decompression function.

4. The apparatus of claim 1, wherein at least one of a group consisting of said first function and said second function comprises at least one of:
encoding function, and
decoding function.

5. The apparatus of claim 1, wherein at least one of a group consisting of said first function and said second function comprises at least one of:
a Moving Picture Experts Group (MPEG) encoding function, and
a MPEG decoding function.

6. The apparatus of claim 1, wherein said video data processing chip is implemented as part of a central processing unit (CPU).

7. The apparatus of claim 1, wherein said video data processing chip is directly coupled to said at least one memory component via a bus system.

8. The apparatus of claim 1, wherein at least one of a group consisting of said video data processing chip and said at least one memory component are mounted on a motherboard.

9. The apparatus of claim 8, wherein said at least one of said group consisting of said video data processing chip and said at least one memory component is plugged into said motherboard.

10. The apparatus of claim 8, wherein said mother board comprises:
    a central processing unit (CPU) coupled to said video data processing chip via a first bus system; and
    a memory bank coupled to said CPU said first bus system.

11. The apparatus of claim 10, wherein said memory bank comprises:
    at least one single in-line memory module (SIMM), said at least one SIMM including at least one random access memory (RAM) component.

12. The apparatus of claim 10, wherein said CPU is directly coupled to said video data processing chip via said first bus system.

13. The apparatus of claim 10, wherein said video data processing chip is coupled to said at least one memory component via a second bus system, said second bus system being separate from said first bus system.

14. The apparatus of claim 13, wherein said video data processing chip is directly coupled to said at least one memory component via said second bus system.

15. A motherboard, comprising:
    a first central processing unit (CPU);
    a memory component coupled to said first CPU via a first bus system;
    a second CPU mounted to said motherboard, said second CPU being programmable to perform a first function and a second function, said first function being different from said second function; and
    at least one additional memory component, coupled to said second CPU via a second bus system, provided to store a first software program configured to fulfill said first function when it is executed by said second CPU and a second software program configured to fulfill said second function when it is executed by said second CPU, said second CPU being configurable to load said first software program to perform said first function and to change functionality of said video data processing chip from said first function to said second function by loading said second software program during processing of said video data.

16. The motherboard of claim 15, wherein at least one of said first function and said second function comprise at least one of:
    an encoding function; and
    a decoding function.

17. The motherboard of claim 15, wherein said second CPU is configurable to process video and graphics data.

18. The motherboard of claim 15, wherein said second CPU is configurable to process at least one of video data and graphics data.

19. The motherboard of claim 15, wherein said at least one additional memory component is directly linked to said second CPU via said second bus system.

20. The motherboard of claim 19, wherein said memory component is directly coupled to said CPU via said first bus system, said first bus system being separate from said second bus system.

21. The motherboard of claim 15, wherein said first bus system is separate from said second bus system.

22. The motherboard of claim 15, wherein said memory component comprises:
    at least one single in-line memory module (SIMM), said at least one SIMM including at least one random access memory (RAM) component.

23. The motherboard of claim 15, wherein said at least one of said group consisting of said second CPU and said at least one additional memory component is plugged into said motherboard.

24. The motherboard of claim 15, wherein said at least one of said group consisting of said second CPU and said at least one additional memory component is directly mounted on said motherboard.

* * * * *